W. T. MATHEEUWISSEN.
FRICTION CLUTCH.
APPLICATION FILED JULY 8, 1916.
1,227,475.
Patented May 22, 1917.
2 SHEETS—SHEET 2.
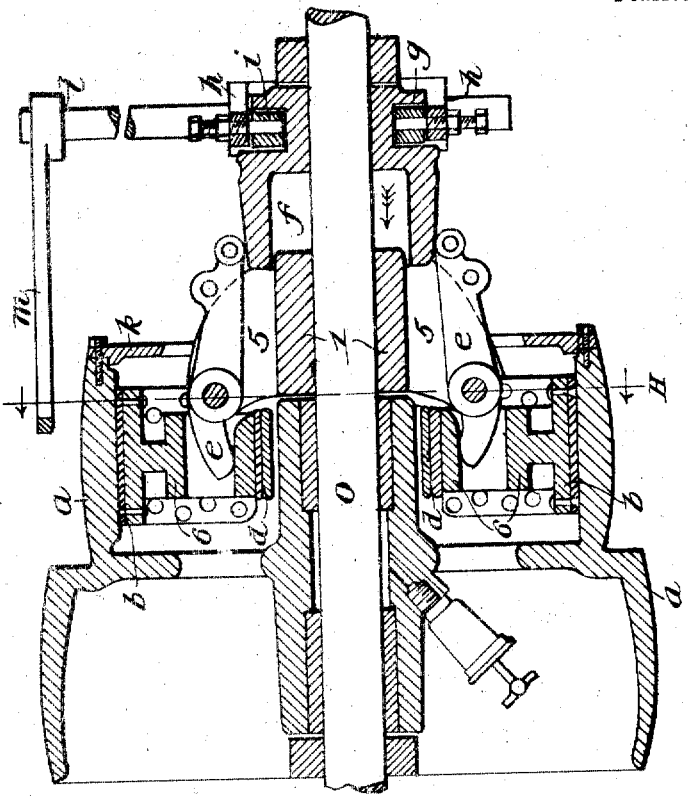
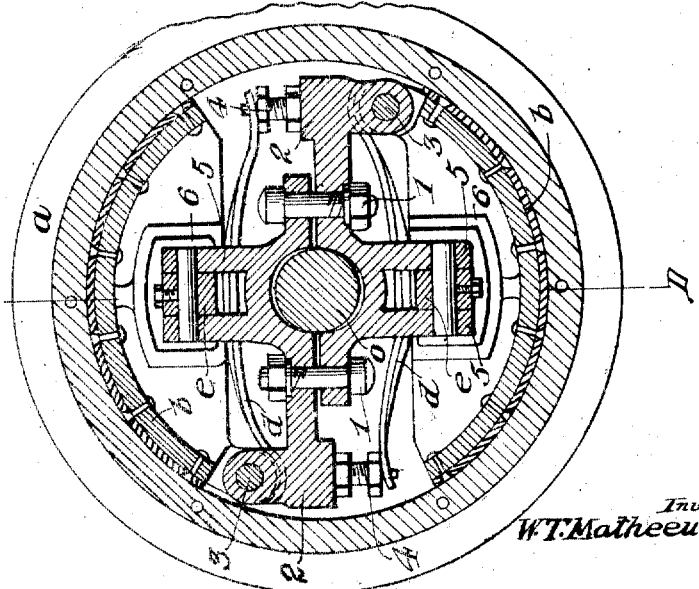
Inventor.
W.T.Matheeuwissen
By William C. Linton
Attorney

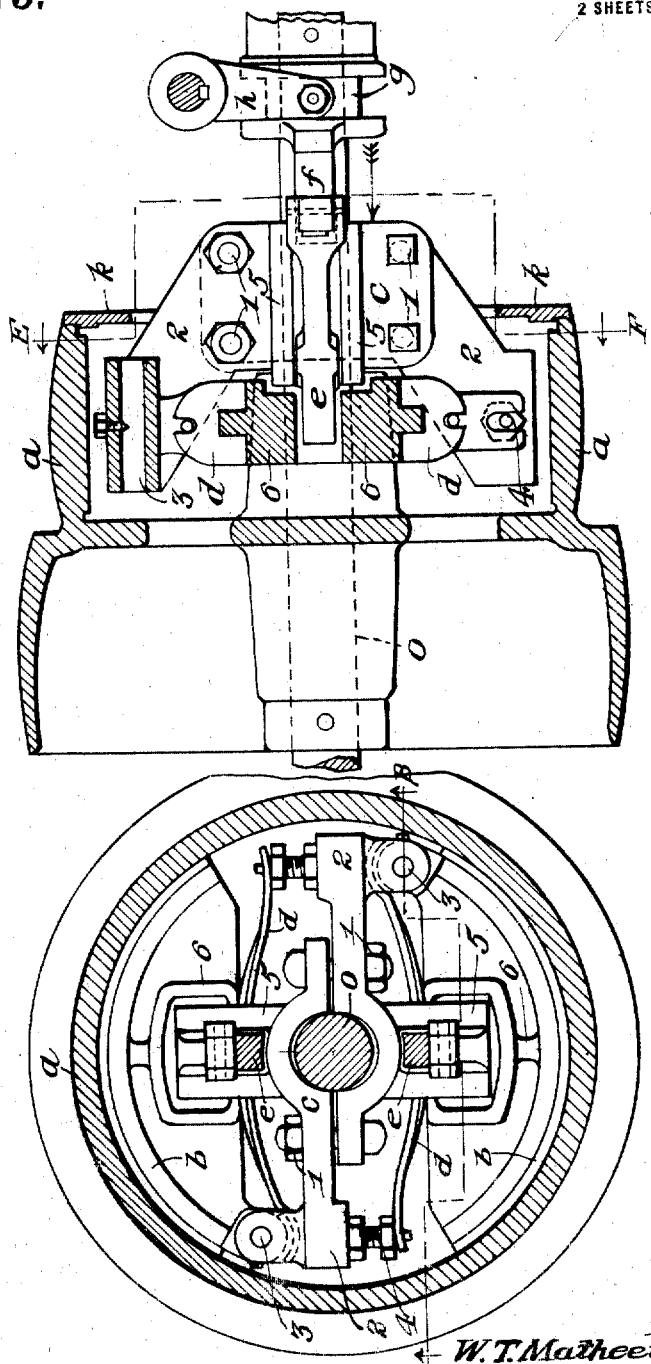

UNITED STATES PATENT OFFICE.

WALTERUS THEODORUS MATHEEUWISSEN, OF ROTTERDAM, NETHERLANDS, ASSIGNOR OF ONE-HALF TO WILLEM TOM, OF KATWYKAAN-ZEE, NETHERLANDS.

FRICTION-CLUTCH.

1,227,475.      Specification of Letters Patent.      Patented May 22, 1917.

Application filed July 8, 1916. Serial No. 108,244.

*To all whom it may concern:*

Be it known that I, WALTERUS THEODORUS MATHEEUWISSEN, a subject of the Kingdom of the Netherlands, of Boompjes 39ª, Rotterdam, Netherlands, have invented new and useful Improvements in Friction-Clutches, of which the following is a specification.

Friction clutches of the kind depending for their grip upon a constant spring pressure or a constant pressure applied by any other means, are associated with the following disadvantages.

If the constant pressure is so regulated or adjusted, that when the motor, for example a motor driving a tool, is developing its maximum power, and is then overloaded, the clutch will slip, the coefficient of friction changes by reason of the slip, and while the slip is taking place. Such changes frequently occur at a very undesirable moment, so that there is no security that the clutch will slip and grip again at the right time. When the motor is working at approximately full power the clutch frequently slips at irregular intervals.

Another disadvantage is that with such clutches it sometimes happens that the motor is stopped by an overload unless an inconveniently large motor is used.

Friction clutches of the known kind operating solely by means of shoes actuated by centrifugal force, the shoes being carried by the driving shaft or some other part driven directly by the motor, have the disadvantage that the motor must already have slowed down considerably before the clutch can slip. This slowing down may cause an explosion motor, for instance, to stop.

Similar disadvantages, in varying degrees, arise where the two methods described are combined.

The object of my invention is to provide a friction clutch which is free from the said disadvantages. To this end I also use spring pressure and centrifugal force in combination, but with the essential difference, that the clutch shoes are carried by the driven shaft, instead of by the driving shaft.

With my improved clutch a much more rapid or sensitive response to changes of load, at the critical stage, is obtained. When an overload occurs and the clutch slips, the pressure exerted by the shoes rapidly decreases, and when the load drops to normal again, the shoe-pressure rapidly rises. The result is, that when running at highest normal load, the clutch is not liable to slip, but maintains a steady grip, whereas at overload an immediate release occurs. As soon as the load drops again to a value very slightly below the normal maximum the clutch grips again.

I use regulatable springs, which is, of course, not in itself a novel feature, but in addition to using such springs I provide for varying the friction while running, and thus secure a wider range of variability as regards the spring pressure in relation to the aggregate pressure.

The invention is illustrated in the accompanying drawings, showing one form of construction.

Figures 1 and 2 are cross-sections of the improved clutch on the lines E—F and G—H of Figs. 3 and 4 respectively, and Figs. 3 and 4 are longitudinal sections of the clutch on the lines A—B and C—D of Figs. 1 and 2.

In the drawings $a$ designates the drum or female member of the clutch, which is revoluble on the driven shaft $o$, and is itself driven by means of a belt or equivalent means from the motor. Within the drum are the clutch shoes $b$ $b$, pivoted upon a boss or hub $c$ on the driven shaft, the latter being, for example, used for driving a machine tool. A pair of adjustable springs $d$ thrust the shoes $b$ against the inner surface of the drum $a$. A ring or flange $k$ at the edge of the drum serves to prevent the scattering of lubricant. The shoes are faced with leather or other suitable material giving the desired constant co-efficient of friction with the drum, which may work in an oil bath.

The hub $c$ comprises two sections adapted to be detachably connected by means of the bolts 1 and through this connection the hub may be connected to the driven shaft $o$ so that the hub and driven shaft will be caused to turn or revolve in unison. Extending from each section of the hub is an arm 2 to which is pivoted as at 3 one end of the shoes $b$. The leaf springs $d$ each have one end connected to the arm of one section, whereas the opposite ends of said springs are adjustably connected by means of the set screws 4 to the arms of the opposite section of the hub. Extending from each section of the hub and adapted to extend diametrically opposite when the hub is secured to the driven shaft are the extensions 5 and loosely connected to these extensions are the loops 6 carried by and projecting inwardly from the medial portion of the shoes $b$. The medial portions of the springs $d$ rest against the inner ends of the loops 6 thereby normally causing the shoes $b$ to be held in contact with the drum $a$. Projecting within each of the loops 6 is an arm of the levers $e$.

On the driven shaft there is a sliding collar $g$ having two wedge members $f$. These wedges can be pushed between the boss $c$ and the longer arms of two double armed levers $e$ mounted upon the boss, causing these levers to withdraw the shoes from the inner surface of the drum.

The collar $g$ is moved by means of a lever $m, l,$ having dogs $h$ which engage a groove $i$ in the collar. The clutch can thus be declutched, and let in, by actuating the lever $m, l,$ and on occurrence of an overload the clutch can slip, and then reëngage when the load has fallen to something below the maximum normal.

When the overload occurs the speed of rotation of the driven shaft $o$, and of the clutch and motor, is reduced, and the centrifugal force whereby the shoes $b$ are thrust against the drum is reduced. When it is retarded, the motor, provided with a fly wheel or fly wheels of specially large size and weight, develops for a few revolutions a power higher than the normal, this being due to the momentum of the retarded fly wheel. The reduction of centrifugal force causes the shoes to lose their grip, and the clutch slips, so that the shaft $o$ is driven at a speed lower than that of the drum $a$. The centrifugal force continues to fall, and the slip increases.

The rapidity with which the pressure responds to changes of speed, falling when the speed is reduced and vice versa, causes the shaft to stop after a few revolutions the centrifugal force then ceasing entirely. This stoppage occurs almost immediately after the commencement of the slip, the motor meanwhile retaining considerable speed.

The springs $d$ are so adjusted that while the motor is driven at full power it can continue running for a considerable time, with the clutch slipping, even with a heavy overload.

When the load drops again to a value slightly below that for which the clutch is set the driven shaft is again set in motion, and centrifugal force causes the shoes to come into action again and give the clutch its full grip. When this condition has been restored there is no liability of the clutch to slip, even when running continuously at the maximum load for which it is set.

It will be seen that with the improved arrangement described, combining spring pressure with centrifugal force, the centrifugal members being carried by the driven shaft, a very quick change is obtained, from full clutch action to partial action and slip, when the load increases, and vice versa. The clutch is also permanently reliable, in spite of the well known fact that slight changes of the coefficient of friction are not always in practice avoidable. Stoppage of the motor, due to overload, does not take place. Breakage of gear in case of overload need not be feared, as for example in the case of ships' winches operated by cables, provided the gear or cable is of such strength as to stand the maximum load for which the clutch is adjusted. Another advantage is that the clutch action can be reduced by hand, by actuating the lever $l, m,$ the latter being rocked so as to suitably reduce the pressure with which the shoes are thrust against the drum. This enables the clutch to be safely used, for example, for driving a winch having a rope somewhat weaker than is required for the full load for which the clutch is normally set, the lever being held in such a position as to give a grip commensurate with the strength of the rope.

What I do claim as my invention and desire to secure by Letters Patent is:

1. A clutch comprising a driving drum, clutch shoes adapted to engage the inner periphery of said drum, a driven shaft, a hub carried thereby, radially extending arms carried by said hub, one end of each of said clutch shoes being pivotally connected to one of said arms, leaf springs carried by said arms, means carried by the medial portion of said shoes for resting upon said springs whereby the shoes will normally be held in contact with said drum and means for acting against the tension of said springs whereby said clutch shoes may be gradually withdrawn from contact with said drum.

2. A clutch comprising a driving drum, clutch shoes adapted to engage said drum, a driven shaft, a hub carried by said shaft, oppositely extending arms carried by said hub, leaf springs adjustably mounted upon said arms, a loop carried by the medial portion of each of said shoes, one of said loops adapted to normally rest upon the medial portion of each of said springs, and a loose connection between said loops and said hub.

3. A clutch comprising a driving drum, clutch shoes adapted to engage said drum, a driven shaft, a hub carried by said shaft, a pair of diametrically extending arms carried by said hub, one end of each of said shoes being pivotally connected to one of said arms, an inwardly projecting loop carried by each of said shoes, means for loosely connecting said loops to said hub and adjustable springs carried by said hub for normally engaging said loops substantially as and for the purpose set forth.

4. A clutch comprising a driving drum, clutch shoes adapted to engage said drum, a driven shaft, a sectional hub adapted to be connected to said shaft, an arm extending from each section of said hub, one end of each of said clutch shoes being pivotally connected to one of said arms, leaf springs each having one end connected to said arms and the opposite ends of said leaf springs being adjustably secured to the opposite arms to which they have one end connected, extensions carried by said hub, an inwardly projecting loop carried by each of said shoes and loosely connected to said extensions, and said leaf springs adapted to normally engage said loops substantially as and for the purpose specified.

5. A clutch comprising a driving drum, clutch shoes adapted to engage the inner periphery of said drum, a driven shaft, a sectional hub adapted to be detachably connected to said shaft, an arm extending from each section of the hub, one end of each of said clutch shoes being pivotally connected to the outer ends of said arms, a pair of oppositely arranged leaf springs supported by said arms, one end of each of said leaf springs being adjustably connected to said arms, extensions carried by each section of the hub, inwardly projecting loops carried by the medial portions of said clutch shoes and adapted to be loosely connected to said extensions, the inner ends of said loops adapted to rest upon the medial portion of said leaf springs whereby said clutch shoes will be normally held in contact with the inner periphery of said driving drum, a pair of pivotally mounted levers, one end of each of said levers adapted to rest within said loops and a slidable member adapted to engage the opposite ends of said levers whereby the said levers may cause said clutch shoes to be gradually withdrawn from contact with said driving drum.

In testimony whereof I affix my signature in presence of two witnesses.

WALTERUS THEODORUS MATHEEUWISSEN.

Witnesses:
 M. A. HEEL,
 L. M. HEMMER.